J. E. MORRISON.

DRIVEN OR BORED WELLS.

No. 7,580. Reissued March 27, 1877.

Witnesses:

C. F. Smith

J. Mason Goodler

Inventor.

Joseph E. Morrison, by Sherburne & Co.

Attorneys.

N. PETERS, PHOTO-LITHOGRAPHER, WASHINGTON, D. C.

UNITED STATES PATENT OFFICE

JOSEPH E. MORRISON, OF AURORA, ILLINOIS.

IMPROVEMENT IN DRIVEN OR BORED WELLS.

Specification forming part of Letters Patent No. 139,018, dated May 20, 1873; reissue No. 7,580, dated March 27, 1877; application filed November 30, 1874.

*To all whom it may concern:*

Be it known that I, JOSEPH E. MORRISON, now of Aurora, in the county of Kane and State of Illinois, but formerly of Willington, State of Connecticut, have invented a new and useful Improvement in Driven or Bored Wells; and I do hereby declare the following to be a full, clear, and exact description thereof, which will enable others skilled in the art to which my invention appertains to make and use the same, reference being had to the accompanying drawing, forming a part of this specification, in which—

Figure 1:
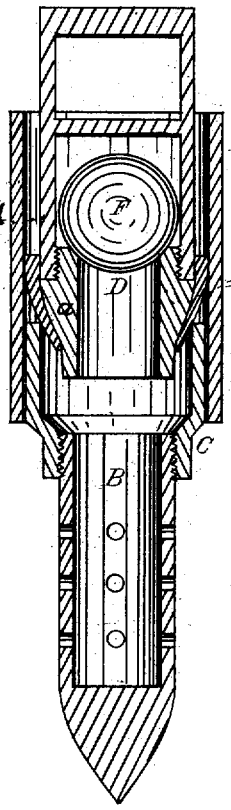
Figure 2:
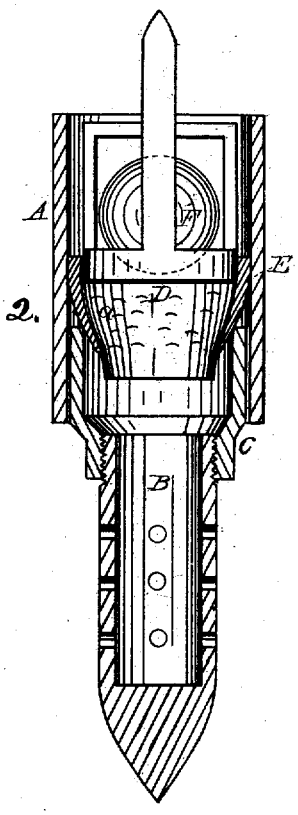

Figure 1 is a vertical central section of my said invention; and Fig. 2 is a partial central section of the same, showing an external view of the valve-seat.

Similar letters of reference indicate like parts in both figures of the drawings.

My invention relates to that class of wells constructed by driving or otherwise sinking a metal tube into the earth, and provided with pump-valves, and a filter extending below the tube into the water, all adapted to be introduced into the tube after it has been driven; and its objects are to facilitate the adjustment of the lower valve-seat, and to insure a water-tight joint between the periphery of the valve-seat and the inner side of the tube and upper end of the filter, at the junction of the latter with the valve-seat. To that end it consists in a valve-seat having an elongated conical base, the lower end adapted to loosely enter the cavity in the upper end of the filter, and its upper end arranged to approximate the diameter of the cavity of the tube, whereby the valve-seat may be dropped through the cavity of the tube into the orifice in the filter after the tube has been driven, or removed therefrom upward through the tube without removing the filter. It further consists, in combination with the conical valve-seat, of a packing-band of leather, or other flexible material, arranged around the periphery of the valve-seat, and adapted to pass through the cavity of the tube, whereby the space between the periphery of the body of the valve-seat and inner surface of the tube, and also the base of the valve-seat and inner surface of the collar or orifice of the filter, are tightly closed.

In the drawing, A represents the main tube, which is constructed of wrought-metal pipe in the usual manner. B is the filter, the upper end of which is secured in the lower end of the collar C, as shown in the drawing. The diameter of the upper portion of this collar is such as to pass loosely through the cavity of the main tube, by which means the filter may be passed through the tube after the latter has been driven into place. D is the valve-seat, provided with an elongated conical base, which extends below the seat proper. The central portion of this base is convexed, forming a partially-hemispherical surface, as shown at *a*. The diameter of the central portion of this base is slightly less than the diameter of the cavity of the collar C, and the diameter of the upper portion is slightly less than the diameter of the cavity in the main tube. E is a packing-band, which is fitted around the hemispherical portion *a* of the base, and extends upward to a point slightly below the valve-seat. This packing may be made of leather or other suitable flexible material. The angle of the sides of this elongated base is such as to bring the packing against the inner corner of the wall of the collar, at or near the center of the packing, while the upper edge of the packing is made to rest in contact with the inner surface of the main tube, thus closing the space between the periphery of the valve-seat and inner surface of the tube, as well as the space between the periphery of the base and inner surface of the collar, forming a complete water-tight joint under the valve-seat. F is the ordinary globe check-valve, which rests on the seat D in the usual manner, and operating in connection with the ordinary lift-valve (not shown) working in the main tube A.

My invention is arranged for operation in the following manner: The main tube A is driven into the earth to the requisite depth, in the usual manner. Collar C with the filter B attached is then introduced into the cavity of the tube, allowing the perforated portion of the filter to extend below the main tube. Valve-seat D, with the packing-band E is then introduced into the tube, and is forced downward through the same until the lower end of the base and packing-band enter the collar, and by a further descent of the valve-seat the packing is compressed against the inner surface of the collar and tube, forming a water-tight joint below the seat. The ordinary lift-valve is then introduced into the cavity of the main tube, and connected to the pump-handle in the usual manner, and the pump is complete.

It is obvious that this arrangement of valve-seat is more readily introduced than would be if it were screwed into the collar. Besides, it can be readily removed by simply grappling its upper part with a suitable tool.

Having thus described my invention, I do not claim the filter projecting below the main tube, for I am aware that the same is shown in patent to Duck and Whipple; but

What I do claim is—

1. The detachable valve-seat D, having the unscrew-threaded elongated conical base, the lower end adapted to loosely enter the orifice of the filter and be driven into place, and its upper end approximating the diameter of the cavity in the tube, as and for the purpose specified.

2. In combination with the detachable valve-seat D, having the elongated conical base, the flexible packing-band E, arranged to close the space between the periphery of the valve-seat and inner surface of the orifice in the collar or filter, as specified.

JOSEPH E. MORRISON.

Witnesses:

J. T. WHIPPLE,

J. K. MORRISON.